United States Patent
Thomas

(10) Patent No.: US 10,100,740 B2
(45) Date of Patent: Oct. 16, 2018

(54) CURVED PLATE/FIN HEATER EXCHANGER

(71) Applicant: United Technologies Corporation, Hartford, CT (US)

(72) Inventor: Michael R. Thomas, Bloomfield, CT (US)

(73) Assignee: United Technologies Corporation, Farmington, CT (US)

( * ) Notice: Subject to any disclaimer, the term of this patent is extended or adjusted under 35 U.S.C. 154(b) by 344 days.

(21) Appl. No.: 14/897,138

(22) PCT Filed: Jun. 13, 2014

(86) PCT No.: PCT/US2014/042218
§ 371 (c)(1),
(2) Date: Dec. 9, 2015

(87) PCT Pub. No.: WO2014/201311
PCT Pub. Date: Dec. 18, 2014

(65) Prior Publication Data
US 2016/0123230 A1    May 5, 2016

Related U.S. Application Data

(60) Provisional application No. 61/835,210, filed on Jun. 14, 2013.

(51) Int. Cl.
*F02C 7/18* (2006.01)
*F28F 3/02* (2006.01)
(Continued)

(52) U.S. Cl.
CPC .............. *F02C 7/185* (2013.01); *F02K 3/115* (2013.01); *F28D 1/0358* (2013.01);
(Continued)

(58) Field of Classification Search
CPC .. F02K 3/115; F05D 2250/61; F05D 2250/71; F05D 2260/213; F28D 9/0025;
(Continued)

(56) References Cited

U.S. PATENT DOCUMENTS 2,792,200 A * 5/1957 Huggins ............... F28D 9/0018
165/10
3,225,824 A * 12/1965 Wartenburg ............ F28B 1/06
165/122
(Continued)

FOREIGN PATENT DOCUMENTS

GB 2426042 11/2006
JP 2009300065 12/2009

OTHER PUBLICATIONS

International Preliminary Report on Patentability for Application No. PCT/US2014/042218 dated Dec. 23, 2015.
(Continued)

*Primary Examiner* — Gerald L Sung
*Assistant Examiner* — Alain Chau
(74) *Attorney, Agent, or Firm* — Carlson, Gaskey & Olds, P.C.

(57) ABSTRACT

A plate/fin heat exchanger includes multiple stacked panels defining a curvature. Each of the panels has a first corrugated sheet defining a first set of passages and a second corrugated sheet defining a second set of passages. Each of the corrugated sheets includes multiple aligned corrugations, and the corrugations of the first corrugated sheet are not aligned with the corrugations of the second corrugated sheet. Each of the corrugations has a corrugation height defined as a length of said corrugation tangential to a curvature of the plate/fin heat exchanger, and wherein each of the first corrugated sheets includes axially aligned corrugations defining a wedge shaped radial cross section.

13 Claims, 5 Drawing Sheets

(51) Int. Cl.
*F28D 9/02* (2006.01)
*F28D 1/03* (2006.01)
*F28D 9/00* (2006.01)
*F02K 3/115* (2006.01)

(52) U.S. Cl.
CPC ............ *F28D 9/0025* (2013.01); *F28D 9/02* (2013.01); *F28F 3/02* (2013.01); *F28F 3/025* (2013.01); *F05D 2250/61* (2013.01); *F05D 2250/71* (2013.01); *F05D 2260/213* (2013.01); *Y02T 50/675* (2013.01)

(58) Field of Classification Search
CPC .......... F28D 1/035; F28D 9/0012; F28D 9/02; F28D 1/0358; F28F 3/02; F28F 3/025; F28F 3/027; F02C 7/185; Y02T 50/675
See application file for complete search history.

(56) References Cited

U.S. PATENT DOCUMENTS

| | | | |
|---|---|---|---|
| 3,546,763 A | 12/1970 | Pasternak | |
| 3,818,984 A * | 6/1974 | Nakamura | F28D 9/0018 165/166 |
| 4,282,927 A * | 8/1981 | Simmons | F28F 3/027 165/166 |
| 4,527,622 A * | 7/1985 | Weber | F28D 9/0018 165/166 |
| 4,966,230 A * | 10/1990 | Hughes | F28D 1/035 165/150 |
| 5,957,194 A | 9/1999 | Azar | |
| 6,102,111 A * | 8/2000 | Kamio | F28D 9/0018 165/165 |
| 6,134,880 A * | 10/2000 | Yoshinaka | F02C 7/143 60/226.1 |
| 7,377,100 B2 | 5/2008 | Bruno et al. | |
| 7,861,512 B2 | 1/2011 | Olver et al. | |
| 8,266,888 B2 | 9/2012 | Liu | |
| 8,376,035 B2 | 2/2013 | Howard et al. | |
| 8,387,362 B2 | 3/2013 | Storage et al. | |
| 8,408,282 B2 | 4/2013 | Brand et al. | |
| 9,243,563 B2 * | 1/2016 | Lo | F02C 7/18 |
| 2008/0095611 A1 | 4/2008 | Storage et al. | |
| 2008/0112798 A1 | 5/2008 | Seitzer et al. | |
| 2009/0031695 A1 | 2/2009 | Perveiler et al. | |
| 2009/0139700 A1 | 6/2009 | Bignon | |
| 2012/0199334 A1 | 8/2012 | Maurer et al. | |
| 2013/0186102 A1 * | 7/2013 | Lo | F02C 7/18 60/785 |

OTHER PUBLICATIONS

International Search Report for PCT Application No. PCT/US2014/042218 dated Oct. 2, 2014.
Supplementary European Search Report for Application No. 14810351.8 dated Dec. 20, 2016.

* cited by examiner

CURVED PLATE/FIN HEATER EXCHANGER

RESEARCH OR DEVELOPMENT

This invention was made with government support under Contract No. FA8650-09-D-2923-AETD awarded by the United States Air Force. The Government has certain rights in this invention.

TECHNICAL FIELD

The present disclosure relates generally to plate/fin heat exchangers, and more particularly to a curved plate/fin heat exchanger.

BACKGROUND OF THE INVENTION

Turbine engines, such as those used on commercial aircraft include many gasflow passages throughout the engine. In order to control the temperature of gas throughout the engine, heat exchangers are used to transfer heat from one gas flow to another gas flow without allowing the gas flows to intermix.

One type of heat exchanger that is often used in turbine engines is a plate/fin heat exchanger. Plate/fin heat exchangers use multiple corrugated sheets to define two sets of passages through which two separate gas flows pass. Heat is transferred through the passage walls joining the two sets of passages without intermixing the gasses between the passages, thereby allowing a hot gas flow in one set of passages to heat a cooler gas flow in the other set of passages or vice versa.

Due to existing corrugated sheet structures, known plate/fin heat exchangers have a rectangular axial cross section. In some applications, such as turbine engine application, the plate/fin heat exchangers are arranged around a central axis. As a result of the rectangular cross section, a radially outward gap occurs between each plate/fin heat exchanger and each adjacent plate/fin heat exchanger when the plate/fin heat exchangers are arranged circumferentially about the axis. The gap creates a dead space that cannot be used and decreases the amount of space available to be used by the heat exchangers.

SUMMARY OF THE INVENTION

A turbine according to an exemplary embodiment of this disclosure, among other possible things includes a compressor section, a combustor in fluid communication with the compressor section, a turbine section in fluid communication with the combustor, a core flowpath passing through the compressor section, the combustor section, and the turbine section, a secondary air flowpath bypassing the compressor section, the combustor section, and the turbine section, and at least one curved plate/fin heat exchangers disposed circumferentially about an axis defined by the turbine engine.

In a further embodiment of the foregoing turbine, each of the at least one curved plate/fin heat exchangers contacts at least one circumferentially adjacent curved plate/fin heat exchanger at a radially inward edge and contacts the at least one circumferentially adjacent curved plate/fin heat exchanger at a radially outward edge such that there is no axial gap between each of the plurality of curved plate/fin heat exchanges and each circumferentially adjacent plate/fin heat exchanger.

In a further embodiment of the foregoing turbine, the at least one curved plate/fin heat exchangers further includes a plurality of stacked panels defining a curvature, each of the panels having a first corrugated sheet defining a first set of passages and a second corrugated sheet defining a second set of passages, each of the first and second corrugated sheets including multiple aligned corrugations, and the corrugations of the first corrugated sheet are not aligned with the corrugations of the second corrugated sheet, and each of the corrugations has a corrugation height defined as a length of the corrugation tangential to a curvature of the plate/fin heat exchanger, and each of the first corrugated sheets includes axially aligned corrugations defining a wedge shaped radial cross section.

In a further embodiment of the foregoing turbine, a radially innermost axially aligned corrugation of each of the first corrugated sheets has a first corrugation height and each axially aligned corrugation has a corrugation height larger than an axially aligned corrugation immediately radially inward, thereby defining the wedge shaped radial cross section.

In a further embodiment of the foregoing turbine, each corrugation on each of the second corrugated sheets has the same corrugation height as each other corrugation on the same corrugated sheet.

In a further embodiment of the foregoing turbine, the turbine further includes an isolation sheet disposed between the first corrugated sheet and the second corrugated sheet of each of the stacked panels.

In a further embodiment of the foregoing turbine, the turbine further includes a radially outer wall contacting each of the stacked panels and a radially inner wall contacting each of the stacked panels, one of the radially inner wall and the radially outer wall includes a gas flow input and the other of the radially inner wall and the radially outer wall includes a gas flow output, and the gas flow input and the gas flow output are connected by the second set of passages.

In a further embodiment of the foregoing turbine, each of the radially inner wall and the radially outer wall include a plurality of passages, such that gas passing through the second set of passages has a serpentine flowpath and crosses the heat exchanger at least twice.

In a further embodiment of the foregoing turbine, the gas passing through the flowpath passes through the heat exchanger at least four times.

In a further embodiment of the foregoing turbine, the at least one curved plate/fin heat exchanger has a secondary air input on a first axial end and a secondary air output on a second axial end.

A plate/fin heat exchanger according to an exemplary embodiment of this disclosure, among other possible things includes a plurality of stacked panels defining a curvature, each of the panels having a first corrugated sheet defining a first set of passages and a second corrugated sheet defining a second set of passages, each of the first and second corrugated sheets including multiple aligned corrugations, and the corrugations of the first corrugated sheet are not aligned with said corrugations of said second corrugated sheet, and each of the corrugations has a corrugation height defined as a length of the corrugation tangential to a curvature of the plate/fin heat exchanger, and each of the first corrugated sheets includes axially aligned corrugations defining a wedge shaped radial cross section.

In a further embodiment of the foregoing plate/fin heat exchanger, a radially innermost axially aligned corrugation of each of the first corrugated sheets has a first corrugation height and each axially aligned corrugation has a corrugation height larger than an axially aligned corrugation immediately radially inward, thereby defining the wedge shaped radial cross section.

In a further embodiment of the foregoing plate/fin heat exchanger, each corrugation on each of the second corrugated sheets has the same corrugation height as each other corrugation on the same corrugated sheet.

In a further embodiment of the foregoing plate/fin heat exchanger, the plate/fin heat exchanger further includes an isolation sheet disposed between the first corrugated sheet and the second corrugated sheet of each of the stacked panels.

In a further embodiment of the foregoing plate/fin heat exchanger, the plat/fin heat exchanger further includes a radially outer wall contacting each of the stacked panels and a radially inner wall contacting each of the stacked panels, one of the radially inner wall and the radially outer wall includes a gas flow input and the other of the radially inner wall and the radially outer wall includes a gas flow output, and the gas flow input and the gas flow output are connected by the second set of passages.

In a further embodiment of the foregoing plate/fin heat exchanger, each of the radially inner wall and the radially outer wall include a plurality of passages, such that gas passing through the second set of passages has a serpentine flowpath and crosses the heat exchanger at least twice.

In a further embodiment of the foregoing plate/fin heat exchanger, the gas passing through the flowpath passes through the heat exchanger at least four times.

A method for conditioning bypass air in a turbine engine according to an exemplary embodiment of this disclosure, among other possible things includes passing bypass air through a curved plate/fin heat exchanger simultaneous with passing hot air through the curved plate/fin heat exchanger, thereby raising a temperature of the bypass air.

In a further embodiment of the foregoing method, passing the heated air through the curved plate/fin heat exchanger includes passing the air radially through the curved plate/fin heat exchanger.

These and other features of the present invention can be best understood from the following specification and drawings, the following of which is a brief description.

DETAILED DESCRIPTION OF AN EMBODIMENT

Figure 1:
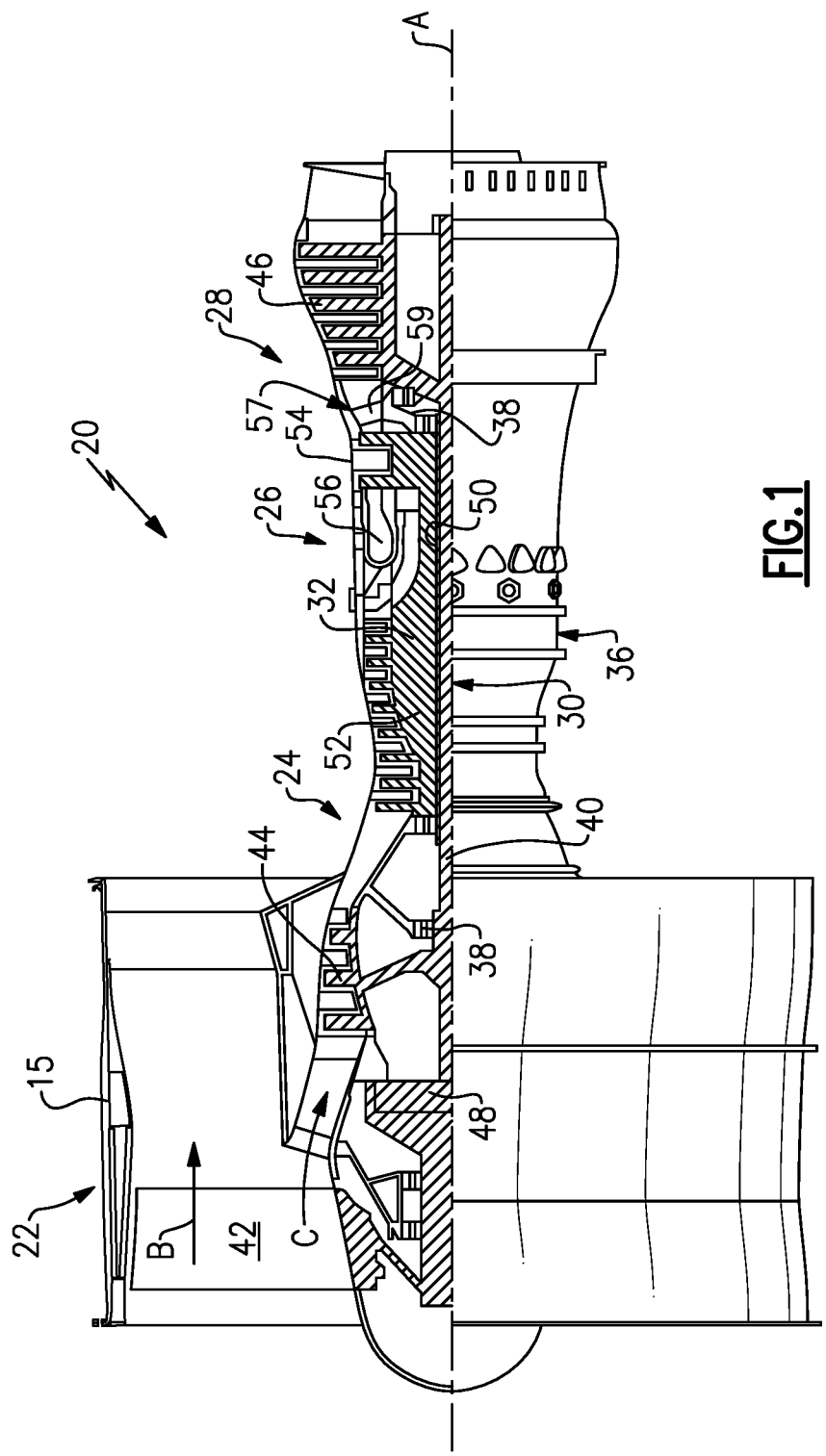
FIG. 1 schematically illustrates an example turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about five (5). In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet.

The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

To further condition the bypass air passing through the turbine engine 20, and to cool heated air being used in the turbine engine 20 (such as a hot side turbine engine air flow), heat exchangers are positioned circumferentially about the turbine engine 20. Bypass air is passed axially through the heat exchangers via axially aligned bypass passages in the heat exchangers. Simultaneously, heated air from a hot air source within the turbine engine 20 is passed through radially aligned passages in the heat exchanger. The bypass passages and the radially aligned passages share a wall isolating the bypass passages from the radially aligned passages and vice versa. The shared wall is thermally conductive, thereby allowing heat to transfer from the heated air passing through the radial passages into bypass air passing through the bypass passages. This heat transfer conditions the bypass air and cools the hot side air simultaneously. While described herein with regards to bypass air, it is understood that the curved plate/fin heat exchanger can be utilized with any secondary air source and is not limited to bypass air of a turbine engine.

Figure 2:
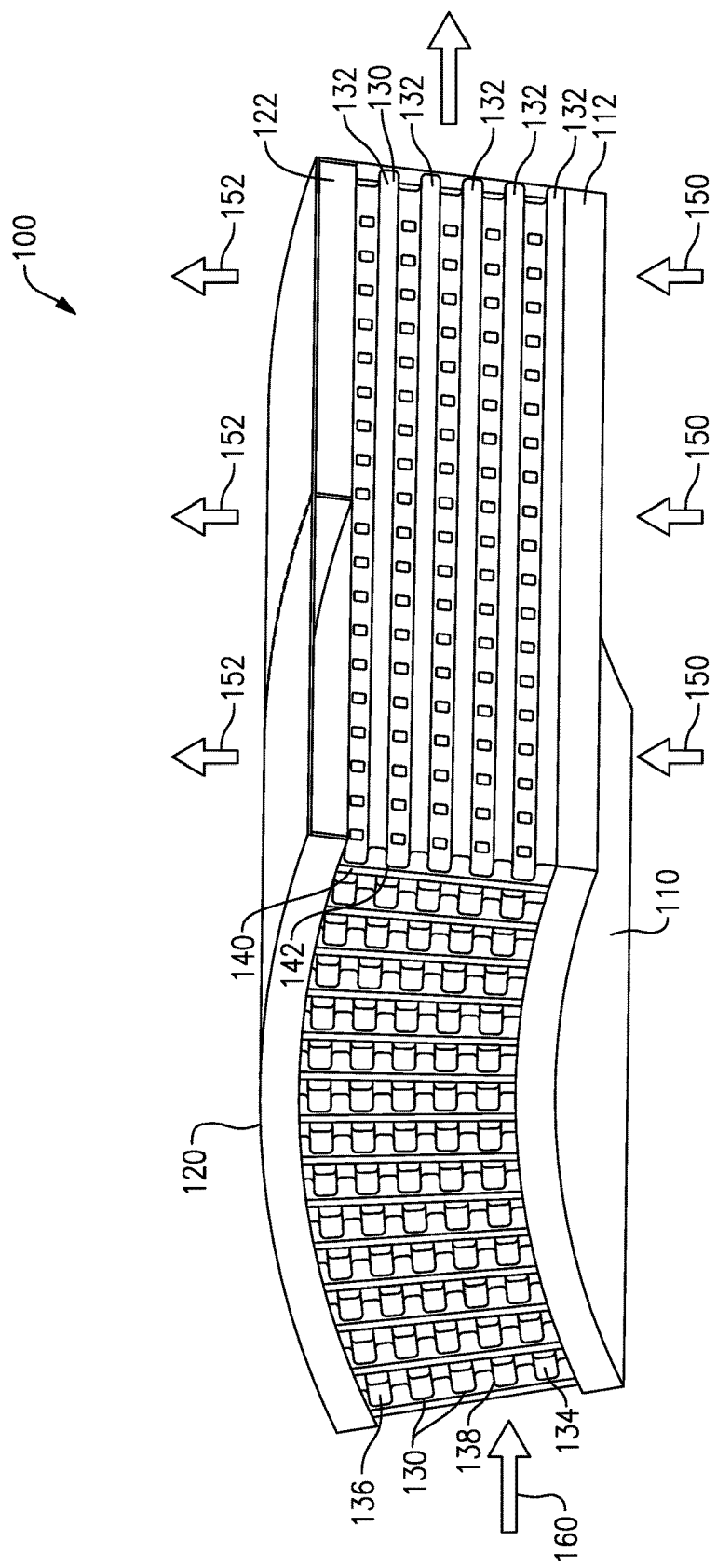
FIG. 2 illustrates an isometric view of an example curved plate/fin heat exchanger.

FIG. 2 illustrates an example curved plate/fin heat exchanger 100 for utilization in a turbine engine, such as the turbine engine 20 illustrated in FIG. 1. The heat exchanger 100 is formed with a radially inner wall 110 and a radially outer wall 120. Each of the walls 110, 120 include passages 112, 122 that connect to a hot fluid such as a hot air input 150 or a hot air output 152 and direct heated air from the hot air input 150, into the heat exchanger 100, and to the hot air output 152. Bypass air from the turbine engine 20 enters the heat exchanger 100 from a first axial end 160, passes axially through the heat exchanger 100, and exits the heat exchanger 100 from a second axial end 162 downstream of the first axial end 160. As the bypass air passes through the heat exchanger 100, heat from the hot air passing through the heat exchanger 100 is transferred to the bypass air, thereby conditioning the bypass air.

Figures 5, 6:
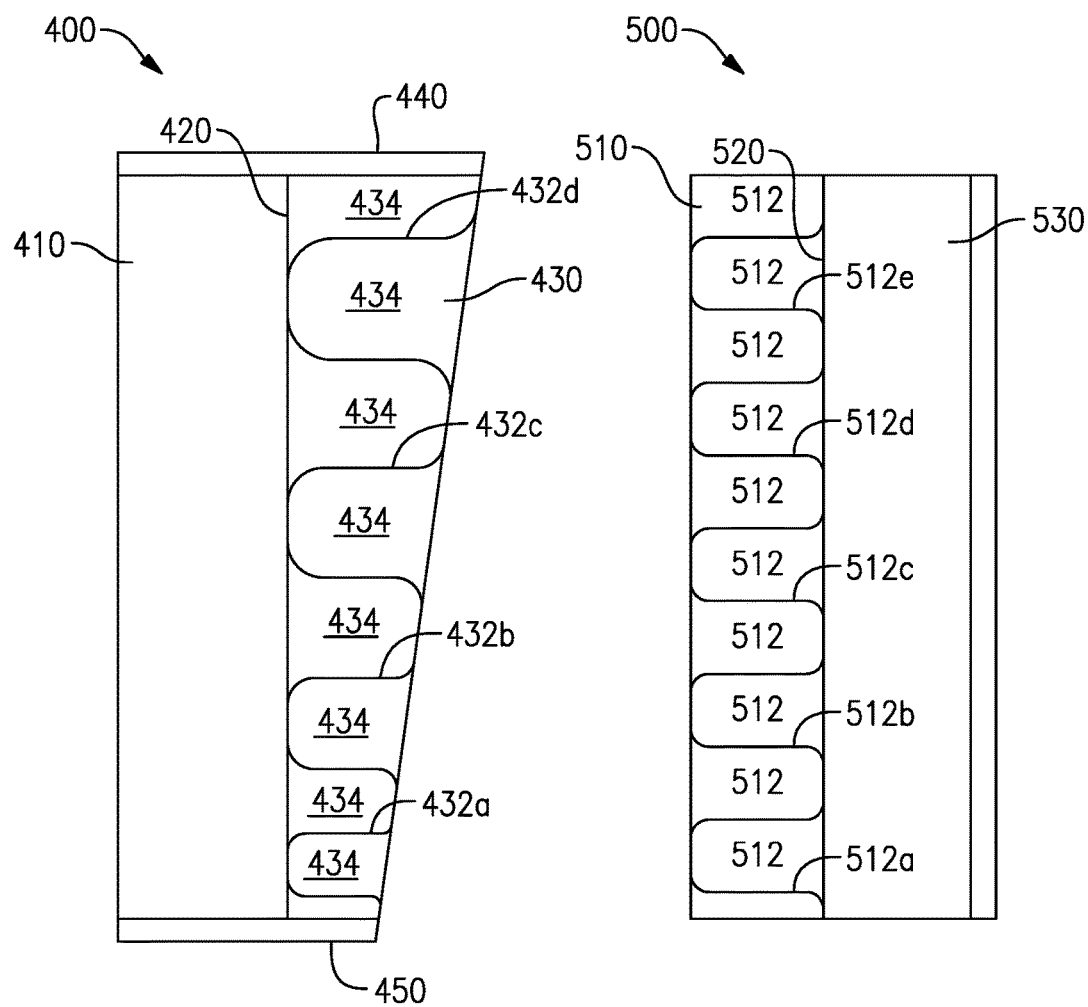
FIG. 5 illustrates an aft facing forward view of a single panel of an example curved plate/fin heat exchanger.
FIG. 6 illustrates a radially outward facing view of a single panel of an example curved plate/fin heat exchanger.

Framed between the inner wall 110 and the outer wall 120 are multiple axially corrugated sheets 130. The axially corrugated sheets 130 include corrugations 132 that define axial passages through the heat exchanger 100. Alternating with the axially corrugated sheets 130 are multiple radially corrugated sheets 140. The radially corrugated sheets 140 include corrugations 142 that define radial passages through the heat exchanger 100. The axially corrugated sheets 130 and the radially corrugated sheets 140 are alternated in such a manner as to define alternating, isolated, axial and radial airflow channels sharing at least one thermally conductive wall. In at least one practical implementation, the passages defined by the axial corrugations are bypass air passages. Each pair of axially corrugated and radially corrugated sheets 130, 140 is referred to as a panel. FIGS. 5 and 6 describe the panels in greater detail. Each of the corrugated sheets 130, 140 includes multiple aligned corrugations 132, 142 such that each sheet defines multiple passages. In some examples, each corrugated sheet 130, 140 is separated from each adjacent corrugated sheet 130, 140 by a thermally conductive wall.

Each of the inner wall 110 and the outer wall 120 define a curvature of the heat exchanger 100, and multiple curved heat exchangers 100 can be disposed about a circumference of the turbine engine 20, illustrated in FIG. 1, without incurring radially outward gaps between the heat exchangers 100. To create the curved structure of the heat exchanger 100, each of the axially aligned corrugated sheets 130 includes multiple corrugations 132 of varying corrugation heights. A radially innermost corrugation 134 is defined as the corrugation 132 positioned closest to the turbine engine 20 about which the heat exchanger 100 is disposed, and a radially outermost corrugation 136 is defined as the corrugation 132 farthest from the turbine engine about which the heat exchanger 100 is disposed.

In order to achieve the illustrated curvature, the innermost corrugation 134 has a first corrugation height (See FIGS. 5 and 6) and the outermost corrugation 136 has a second corrugation height. The corrugation height of the outermost corrugation 136 is larger than the corrugation height of the innermost corrugation 134. Furthermore, each intermediary corrugation 138 between the innermost corrugation 134 and the outermost corrugation 136 has a sequentially larger corrugation height as the intermediary corrugations 136 proceed radially outward. Because of the sequentially increasing corrugation heights of the axially aligned corrugations 132, each panel of the heat exchanger 100 has a wedge shaped cross sectional component. When the panels for the plate/fin heat exchanger 100 are stacked, as in the illustrated example of FIG. 2, the panels form a curvature, and allow a curved inner wall 110 and a curved outer wall 120 to define an overall curved heat exchanger.

Figure 3:
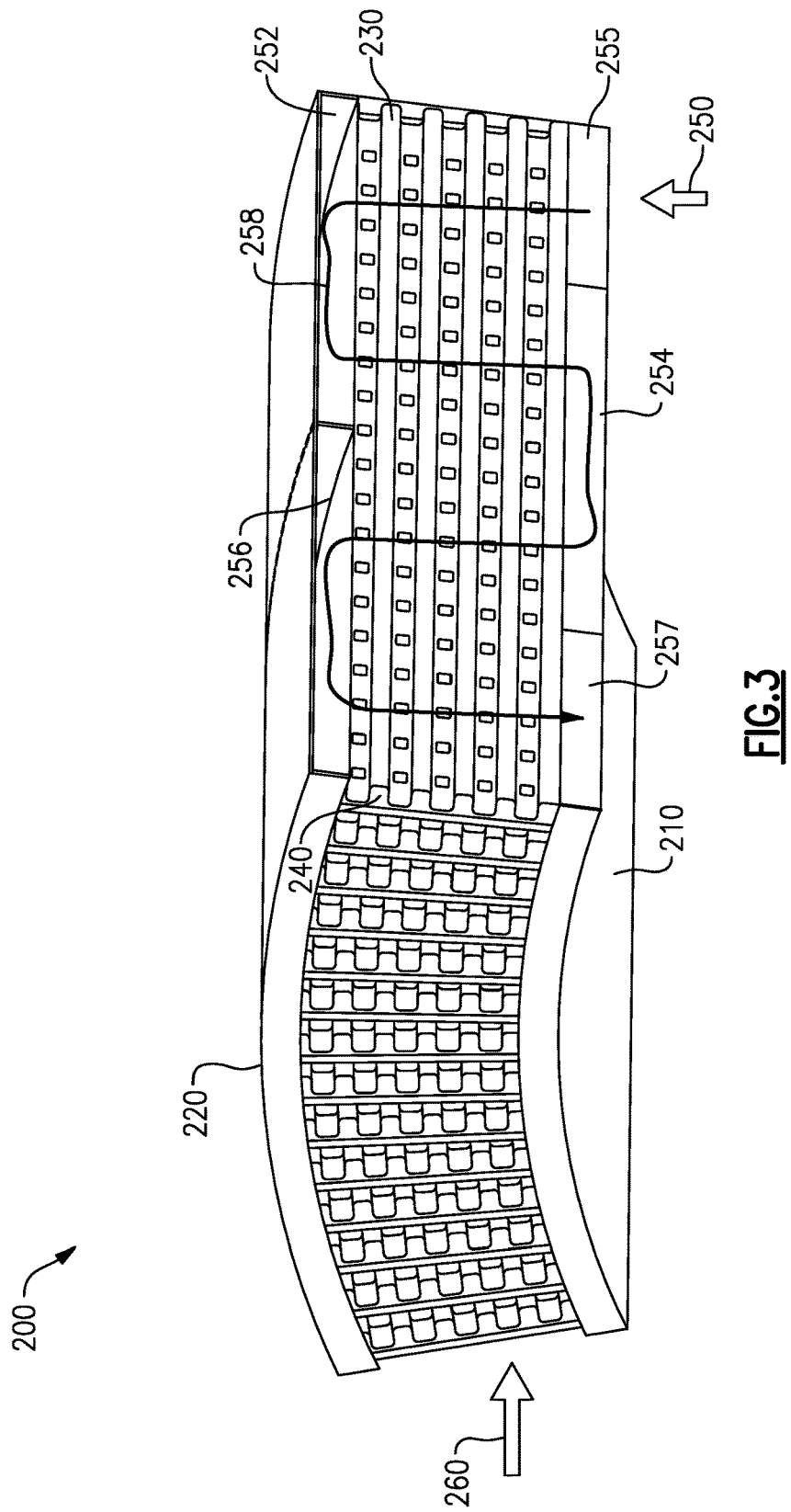
FIG. 3 illustrates an isometric view of an alternate example curved plate/fin heat exchanger.

With continued reference to FIG. 2, FIG. 3 illustrates an alternate example heat exchanger 200 that operates on the same principle as the heat exchanger 100 illustrated in FIG. 2. The alternate example heat exchanger 200 further includes multiple passages 252, 254, 255, 256, 257 within the radially inner surface 210 and the radially outer surface 220 instead of the singular passages 112, 122 included in the example of FIG. 2. The multiple passages 252, 254, 255, 256, 257 force the hot air 250 passing radially through the heat exchanger 200 to have a serpentine flowpath, thereby increasing the length of time that the hot air 250 is thermally contacting the bypass air passages defined by the axially corrugated sheet 230, and increasing the amount of heat transferred to the bypass air 260 from the hot air 250.

As with the example of FIG. 2, the heat exchanger 200 of FIG. 3 includes panels of axially corrugated sheets 230 and radially corrugated sheets 240 in a stacked arrangement. The axially corrugated sheets 230 are arranged with a radially inner corrugation 232 having the smallest corrugation height and the corrugation height of each of the corrugations increases as the corrugations proceed radially outward.

The example heat exchanger 200 of FIG. 3 includes two passages 252, 256 in the radially outer wall 220 and three passages 254, 255, 257 in the radially inner wall 210 to define a serpentine hot air path 258 crossing the heat exchanger four times. One of skill in the art having the benefit of this disclosure could modify the radially inner wall 210 and the radially outer wall 220 to create a heat exchanger having any number passages in the radially inner wall 210 and the radially outer wall 220, and thereby create a flow path where the hot air crosses the heat exchanger 200 as many or as few times as is desired.

Figure 4:
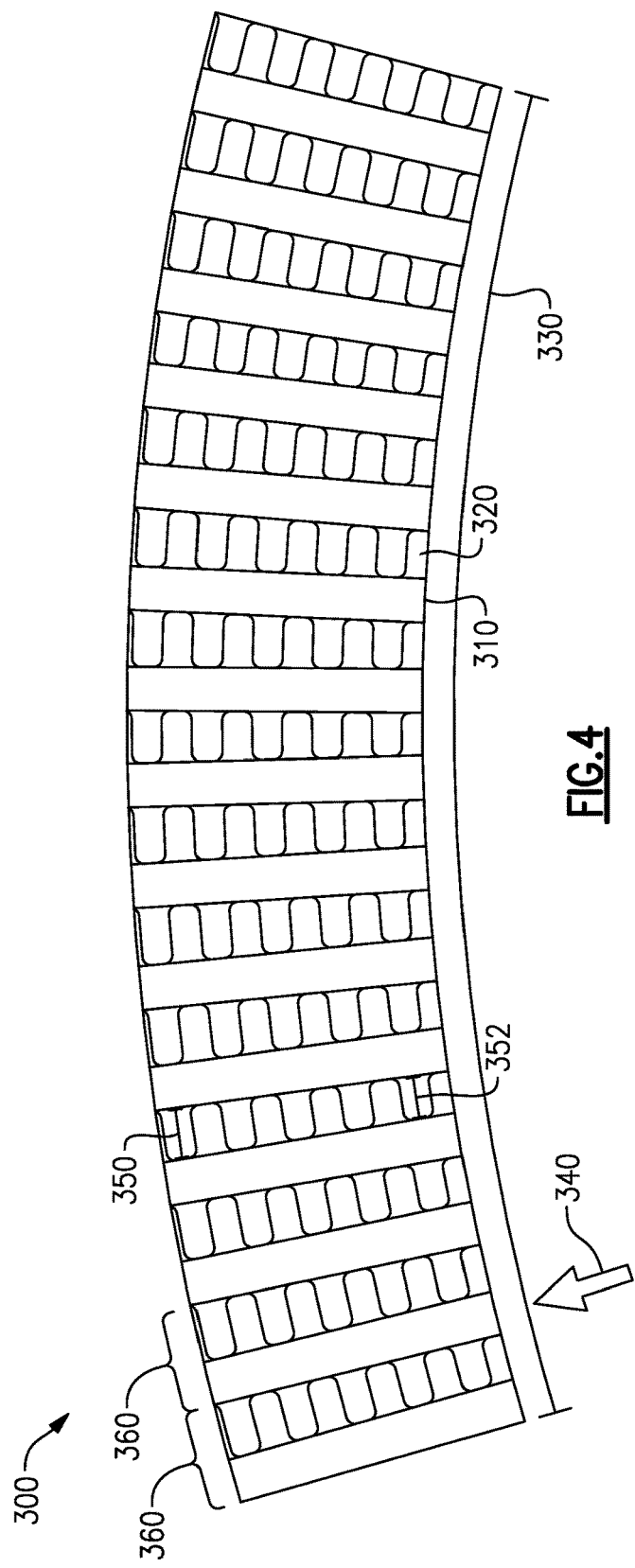
FIG. 4 illustrates an aft facing forward view of an example curved plate/fin heat exchanger.

FIG. 4 is an aft looking forward cross sectional view of an example plate/fin heat exchanger 300, such as the heat exchangers 100, 200 of FIGS. 2 and 3. As with the previous examples, the heat exchanger 300 includes radially corrugated sheets 310 having corrugations that are aligned with the radius of a curvature 330 of the heat exchanger, and axially corrugated sheets 320 having corrugations that are aligned with an axis defined by the curvature 330 of the heat exchanger 300. Each of the axially aligned corrugations has a corrugation height 350, 352 defined as the length of the corrugation tangential to the curvature 330 of the heat exchanger. As can be seen, and as described above with regards to FIGS. 2 and 3, the radially innermost corrugation has a corrugation height 352 that is smaller than any of the other axially aligned corrugations and the radially outermost corrugation has a corrugation height 350 that is larger than any of the other axially aligned corrugations.

The corrugations of the radially aligned corrugated sheets 310 have a corrugation height defined as the length of the corrugation tangential to the curvature 330 of the heat exchanger 300. Unlike the axially aligned corrugations, the radially aligned corrugations of any given corrugated sheet 310 are all the same corrugation height.

As described above, the heat exchanger 300 is constructed of multiple stacked panels 360, each of which includes an axially corrugated sheet 320 and a radially corrugated sheet 310. In some examples the sheets 310, 320 are separated by a thermally conductive wall or barrier to further define and isolate the channels defined by the corrugations. The panels 360 are stacked to create the larger heat exchanger 300 structure, and can be stacked with as many or as few panels as are necessary to fill a desired space.

With continued reference to FIGS. 2-4, FIGS. 5 and 6 schematically illustrate cross sectional views of individual panels 400, 500 that are used to construct a curved heat exchanger 100, 200, 300. FIG. 5 illustrates an aft looking forward cross sectional view of the panel 400, and FIG. 6 illustrates a radially outward looking view of the panel 500 from a radially inward position.

Referring first to FIG. 5, the aft looking view shows a side of a single corrugation of the radially aligned corrugated sheet 410, and each of the individual corrugations 432a-d of the axially aligned corrugated sheet. Each of the axially aligned corrugations 432a-d defines a bypass air passage 434 through which bypass air passes axially through the heat exchanger. A thermally conductive sheet 420 is positioned between the corrugated sheets 410, 432. The panel 400 further includes an illustration of a radially inner wall 450 and a radially outer wall 440 for explanatory purposes. One of skill in the art, having the benefit of this disclosure, would understand that the radially inner wall 450 and the radially outer wall 440 could be a single wall for all of the panels in a heat exchanger, rather than a separate wall for each panel. As can be seen the axially aligned corrugations 432a-d define a wedge shaped portion 430, and the radially aligned corrugations define a rectangular portion.

Referring now to FIG. 6, the radially outward looking view shows a single side of the radially innermost corrugation 530 of the axially aligned corrugations. The radially outward looking view further shows the multiple corrugations of the radially aligned portion 510, and a sheet 520 separating the radially aligned portion 510 from the axially aligned portion. The innermost wall is omitted from the radially outward view for explanatory affect. The radially aligned corrugations define hot air passages 512, and each of the radially aligned corrugations has the same corrugation height creating a rectangular cross section.

In each of the above described examples, the corrugated sheets are solid, uninterrupted corrugated sheets, such as a stamped sheet metal. In alternate examples, particularly alternate examples incorporating an isolation sheet, the corrugated sheets can include perforations or other turbulating features that disturb gasses passing through the heat exchanger, and allow the gasses to move between aligned pathways, while still isolating the radially aligned passages from the axially aligned passages.

While the above examples are described with regard to a heat exchanger 100 for use in a turbine engine, it is further understood that the curved heat exchangers 100 described herein can be utilized in any number of additional apparatuses, such as a land based turbine, and still fall with this disclosure. It is further understood that in some embodiments, a single curved plate/fin heat exchanger can be utilized in place of multiple curved plate/fin heat exchangers.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbine comprising:
a compressor section;
a combustor in fluid communication with the compressor section;
a turbine section in fluid communication with the combustor, a core flowpath passing through said compressor section, said combustor section, and said turbine section;
a secondary air flowpath bypassing said compressor section, said combustor section, and said turbine section; and
at least one curved plate-fin heat exchangers disposed circumferentially about an axis defined by the turbine engine and including
a plurality of stacked panels defining a curvature, each of said panels having a first corrugated sheet defining a first set of passages and a second corrugated sheet defining a second set of passages;
each of said first corrugated sheet and said second corrugated sheet including multiple aligned corrugations, wherein each of said multiple aligned corrugations of the first corrugated sheet and said multiple aligned corrugations of the second corrugated sheet has a corrugation height defined as a length of said multiple aligned corrugation tangential to the curvature of the curved plate-fin heat exchanger, and said multiple aligned corrugations of each of said first corrugated sheets includes axially aligned corrugations defining a wedge shaped radial cross section, wherein a radially innermost axially aligned corrugation of each of said first corrugated sheets has a first corrugation height and the corrugation height of each axially aligned corrugation is larger than the corrugation height of an immediately radially inward axially aligned corrugation, thereby defining said wedge shaped radial cross section;

wherein said multiple aligned corrugations of said first corrugated sheet are not aligned with said multiple aligned corrugations of said second corrugated sheet, and a radially outer wall contacting each of said stacked panels in said plurality of stacked panels and a radially inner wall contacting each of said stacked panels in said plurality of stacked panels;

wherein one of said radially inner wall and said radially outer wall comprises a gas flow input and the other of said radially inner wall and said radially outer wall comprises a gas flow output, and wherein said gas flow input and said gas flow output are connected by said second set of passages; and each of said radially inner wall and said radially outer wall include a plurality of passages, such that gas passing through said second set of passages has a serpentine flowpath and crosses the at least one curved plate-fin heat exchanger at least twice.

2. The turbine of claim 1, wherein each of said at least one curved plate-fin heat exchangers contacts at least one circumferentially adjacent curved plate-fin heat exchanger at a radially inward edge and contacts said at least one circumferentially adjacent curved plate-fin heat exchanger at a radially outward edge such that there is no axial gap between each of said at least one curved plate-fin heat exchangers and each of said at least one circumferentially adjacent plate-fin heat exchanger.

3. The turbine of claim 1, wherein each of said corrugations on each of said second corrugated sheets has the same corrugation height as each other corrugation on the same corrugated sheet.

4. The turbine of claim 1, wherein said gas passing through said flowpath passes through the at least one curved plate-fin heat exchanger at least four times.

5. The turbine of claim 1, further comprising an isolation sheet disposed between said first corrugated sheet and said second corrugated sheet of each of said stacked panels in said plurality of stacked panels.

6. The turbine of claim 1, wherein the at least one curved plate-fin heat exchanger has a secondary air input on a first axial end and a secondary air output on a second axial end.

7. A plate-fin heat exchanger comprising:

a plurality of stacked panels defining a curvature, each of said panels having a first corrugated sheet defining a first set of passages and a second corrugated sheet defining a second set of passages;

each of said first corrugated sheet and said second corrugated sheet including multiple aligned corrugations, and wherein said multiple aligned corrugations of said first corrugated sheet are not aligned with said multiple aligned corrugations of said second corrugated sheet, and wherein each of said multiple aligned corrugations of the first corrugated sheet and said multiple aligned corrugations of the second corrugated sheet has a corrugation height defined as a length of said corrugation tangential to a curvature of the plate-fin heat exchanger; and wherein each of said first corrugated sheets includes axially aligned corrugations defining a wedge shaped radial cross section;

a radially outer wall contacting each of said stacked panels in said plurality of stacked panels and a radially inner wall contacting each of said stacked panels in said plurality of stacked panels;

one of said radially inner wall and said radially outer wall comprises a gas flow input and the other of said radially inner wall and said radially outer wall comprises a gas flow output, and said gas flow input and said gas flow output are connected by said second set of passages; and each of said radially inner wall and said radially outer wall include a plurality of passages, such that gas passing through said second set of passages has a serpentine flowpath and crosses the at least one curved plate-fin heat exchanger at least twice.

8. The plate-fin heat exchanger of claim 7, wherein a radially innermost axially aligned corrugation of each of said first corrugated sheets has a first corrugation height and each axially aligned corrugation has a corrugation height larger than a corrugation height of an immediately radially inward axially aligned, thereby defining said wedge shaped radial cross section.

9. The plate-fin heat exchanger of claim 8, wherein each of said corrugations on each of said second corrugated sheets has the same corrugation height as each other corrugation on the same corrugated sheet.

10. The plate-fin heat exchanger of claim 7, wherein said gas passing through said flowpath passes through the at least one curved plate-fin heat exchanger at least four times.

11. The plate-fin heat exchanger of claim 7, further comprising an isolation sheet disposed between said first corrugated sheet and said second corrugated sheet of each of said stacked panels in said plurality of stacked panels.

12. A method for conditioning bypass air in a turbine engine comprising the step of:

passing bypass air through a curved plate-fin heat exchanger simultaneous with passing hot air through said curved plate-fin heat exchanger, thereby raising a temperature of said bypass air, and wherein passing hot air through the curved plate-fin heat exchanger comprises passing the hot air through a plurality of passages in a radially inner wall, and a plurality of passages in a radially outer wall, thereby defining a serpentine flowpath for the hot air; and wherein the curved plate-fin heat exchanger is the plate-fin heat exchanger of claim 7.

13. The method of claim 12, wherein passing said hot air through said curved plate-fin heat exchanger comprises passing said hot air radially through said curved plate-fin heat exchanger.

* * * * *